(12) United States Patent
Caruthers et al.

(10) Patent No.: US 6,466,469 B1
(45) Date of Patent: Oct. 15, 2002

(54) POWER CONVERTER MODULATION USING PHASE SHIFTED SIGNALS

(75) Inventors: Michael A. Caruthers, Peoria, IL (US); Jeff Reichard, West Allis, WI (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/738,933

(22) Filed: Dec. 15, 2000

(Under 37 CFR 1.47)

Related U.S. Application Data

(60) Provisional application No. 60/171,041, filed on Dec. 16, 1999.

(51) Int. Cl.[7] .................................................. H02M 1/12
(52) U.S. Cl. ........................................................ 363/72
(58) Field of Search ............................. 363/72, 71, 40, 363/41

(56) References Cited

U.S. PATENT DOCUMENTS

| | | |
|---|---|---|
| 4,174,534 A | 11/1979 | Kotlarewsky |
| 4,338,658 A | 7/1982 | Toy |
| 4,382,275 A | 5/1983 | Glennon |
| 4,734,844 A | 3/1988 | Rhoads |
| 4,797,801 A | 1/1989 | Furuhashi et al. |
| 4,941,076 A | 7/1990 | Diaz |
| 4,967,333 A | 10/1990 | Callier et al. |
| 5,016,158 A | * 5/1991 | Matsui et al. .................. 363/71 |
| 5,132,892 A | 7/1992 | Mizoguchi |
| 5,191,520 A | 3/1993 | Eckersley |
| 5,757,634 A | 5/1998 | Ferens |

FOREIGN PATENT DOCUMENTS

| | | |
|---|---|---|
| GB | 2019673 | 10/1979 |
| JP | 60 098875 | 6/1985 |

* cited by examiner

Primary Examiner—Shawn Riley
(74) Attorney, Agent, or Firm—Clifton G Green

(57) ABSTRACT

A circuit for transmitting power. A controller circuit transmits n command signals. N power converter circuits are coupled with the controller circuit, and respectively receive the n command signals. The n power converter circuits respectively transmit n pulse width modulated signals as a function of the n command signals, with the n pulse width modulated signals being out of phase by approximately 360/n degrees.

32 Claims, 4 Drawing Sheets

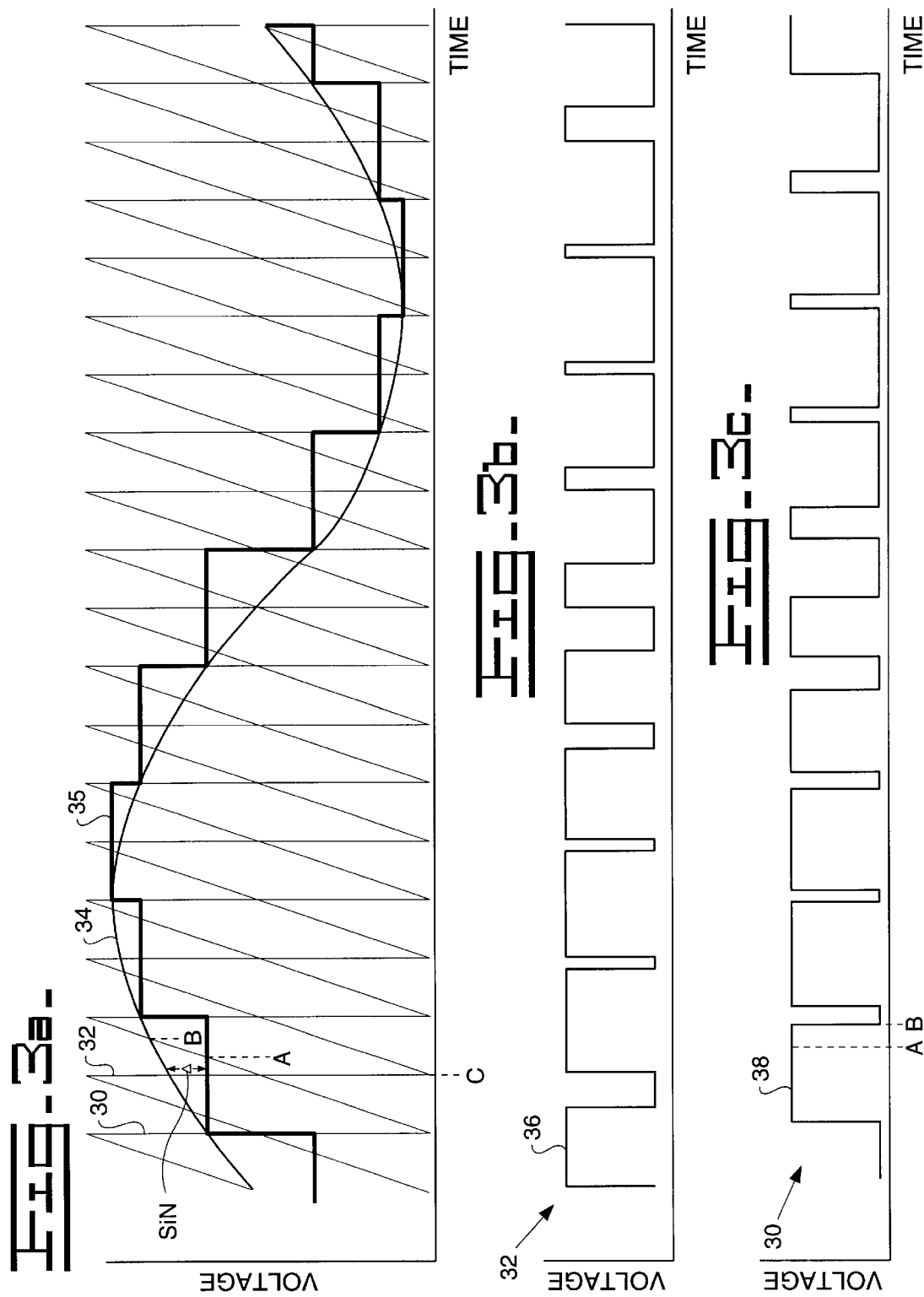

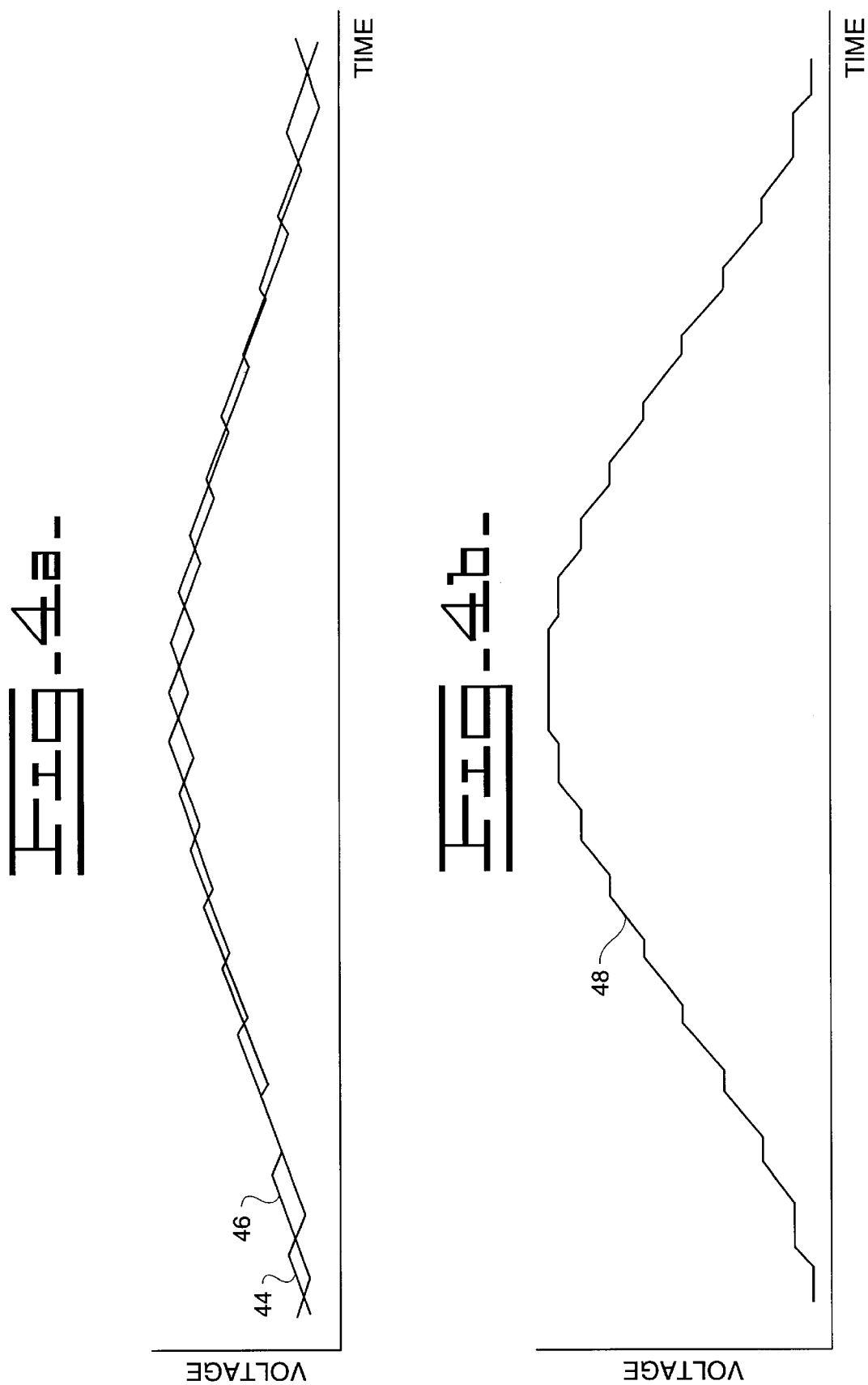

POWER CONVERTER MODULATION USING PHASE SHIFTED SIGNALS

This application claims the benefit of prior provisional patent application Serial No. 60/171,041, filed Dec. 12, 1999.

TECHNICAL FIELD

The present invention relates generally to conversion of electrical power, and more specifically to a method and apparatus for converting electrical power from direct current into alternating current.

BACKGROUND OF THE INVENTION

Many conventional power converters/inverters for transforming direct current ("D.C.") power into alternating current ("A.C.") power use parallel architecture. One frequently used technique supplies the D.C. power to several power converter modules in parallel, which then output pulse width modulation ("PWM") signals. The PWM signals are typically created using switching devices known to those skilled in the art, such as transistors or thyristors. A common command signal is sent to each of the power converter modules, causing the switching devices to open and close in a specific and uniform pattern, thereby producing the PWM signals.

The PWM signals are then fed into respective inductors, which produce a current signal approximately equal to the integral of the PWM signal. The outputs of the inductors are combined, forming an approximation of a sine wave.

Although this technique produces a sine wave, the sine wave typically contains a ripple current having a relatively low frequency and high amplitude. FIG. 1 is an example of a sine wave containing this type of ripple current.

Filtering may be used to smooth the ripple current, thereby producing a more exact approximation of a sine wave. Due to the low frequency and high amplitude of the ripple current, however, the filtering components needed are of considerable size and produce a significant amount of heat.

SUMMARY OF THE INVENTION

The present invention provides apparatus and methods for transmitting power. A controller circuit transmits n command signals. N power converter circuits are coupled with the controller circuit, and respectively receive the n command signals. The n power converter circuits respectively transmit n pulse width modulated signals as a function of the n command signals, with the n pulse width modulated signals being out of phase by approximately 360/n degrees.

BRIEF DESCRIPTION OF THE DRAWINGS

FIG. 3 is timing diagrams according to one embodiment of the invention showing various signals present in the power conversion system using two power converter modules when transmitting power.

FIG. 4 is a waveform diagram according to one embodiment of the invention.

DETAILED DESCRIPTION OF THE INVENTION

Figure 2:
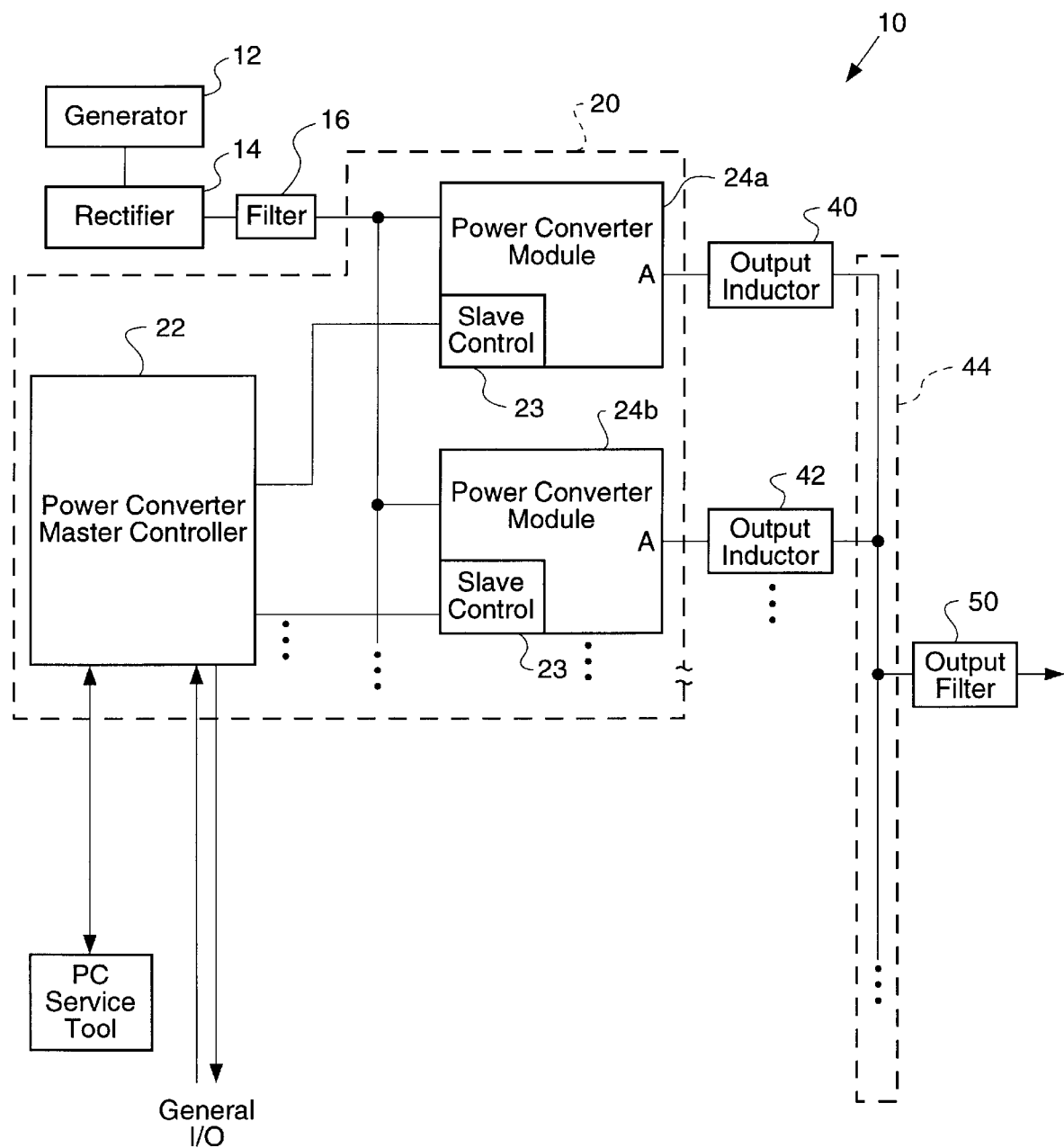
FIG. 2 is a functional block diagram of a power conversion system according to one embodiment of the invention.

FIG. 2 is a functional block diagram of a power conversion system 10 according to one embodiment of the invention. The power conversion system 10 includes a generator 12 that produces an A.C. power signal by any of various ways known to those skilled in the art. The A.C. power signal is fed into a rectifier 14 that produces a D.C. power signal by any of various ways known to those skilled in the art. The D.C. power signal is typically filtered by a filter 16 before being transmitted to a power converter system 20. The filter 16 may be any of a variety of appropriate filtering devices known to those skilled in the art.

The power converter system 20 typically includes a controller circuit, such as a master controller 22 and n slave controllers 23, and a known number n of power converter circuits 24, such as 3 phase PWM power converters. Although the embodiment of the invention as shown in FIG. 2 depicts the slave controller 23 as being physically distinct from the master controller 23, in other embodiments the master and slave controllers 22, 23 may be integrated.

In one embodiment, n is equal to four. For simplicity, only two power converter circuits 24 are shown in FIG. 2, although the invention described herein can be easily applied to any power conversion system 10 using more than one power converter circuit 24. In one embodiment when n=4, each of the power converter circuits 24 transmits 250 kilowatts ("KW"); thus the power conversion system 10 is rated for 1 megawatt ("MW"). Other power ratings may also be used, both by varying the amount of power transmitted by each power converter circuit 24, and by varying the number of power converter circuits 24.

In one embodiment, the master controller 22 determines a reference wave value, e.g., an amplitude of a reference wave, such as a sine wave, at a particular point in time. The master controller 22 may receive an appropriate reference wave signal from an outside source (not shown), or may calculate it internally. In one embodiment, a look up table (not shown) stores the value of the reference wave signal over time, and the master controller 22 refers to the look up table to determine the reference wave. Other types of reference waves, such as sawtooth or triangle waves, or square waves for example, may also be used in appropriate embodiments. The reference wave value is typically updated on a first edge or edges of the respective carrier wave. For example, in one embodiment, the reference wave value is determined on the falling edge of the carrier waves. In other appropriate embodiments, the reference wave value may be determined on a rising edge of the carrier wave, or on both the rising and falling edges.

The n slave controllers 23 respectively determine or receive n carrier waves, such as sawtooth or triangle waves, with the carrier waves being out of phase by approximately 360/n degrees. Similar to the master controller 22, the slave controller 23 may receive the appropriate wave from an outside source (not shown), or may calculate it internally. Other types of carrier waves, such as sine waves and square waves for example, may also be used in appropriate embodiments.

The n slave controllers 23 transmit n command signals, such as switching signals, to respective power converter circuits 24 as a function of the reference wave and the respective carrier wave. In one embodiment, the n command signals transmitted by the slave controllers 23 are determined by comparing the magnitude or amplitude of the respective carrier wave with the magnitude or amplitude of the reference wave.

As shown in FIG. 2, the master controller 22 may receive data via an input signal indicating a desired power output from the power converter system 20. The master controller 22 may then cause the slave controller to adjust the n command signals appropriately to achieve the desired power output.

The n power converter circuits 24 receive the n command signals, and transmit respective PWM signals as a function of the n command signals by any of a variety of appropriate ways known to those skilled in the art. In one embodiment, the power converter circuit 24 transmits a positive PWM signal when the carrier wave is less than the reference wave, and transmits a negative PWM signal when the carrier wave is greater than the reference wave.

The slave controllers 23 determine and transmit appropriate switching signals to achieve these results by ways known to those skilled in the art, such as by turning on/off (switching) transistors or thyristers within the power converter circuits 24. Because the carrier waves for each power converter circuit 24 are out of phase, their respective PWM signals will also be out of phase by approximately 360/n degrees.

FIGS. 3a–c are timing diagrams according to one embodiment of the invention showing various signals present in the power conversion system 10 using two power converter circuits 24 when transmitting power. FIG. 3a is a timing diagram showing a first sawtooth carrier wave 30 and a second sawtooth carrier wave 32. Because the number of carrier waves corresponds to the number of power converter circuits 24 being used, two carrier waves 30, 32 are shown. The first carrier wave 30 is used to determine the PWM signal to be transmitted by power converter circuit 24a, while the second carrier wave 32 is used to determine the PWM signal to be transmitted by power converter circuit 24b. Because a total of two power converter circuits 24a, 24b are being used to transmit power, the second carrier wave 32 is out of phase from the first carrier wave 30 by approximately 180 degrees (360/n, n=2).

FIG. 3b is a timing diagram showing an output waveform 36 of power converter circuit 24a as a function of the second carrier wave 32 and the reference wave 34. As described above, the PWM signal is positive when the second carrier wave 32 is less than the reference wave 34 and negative when the second carrier wave 32 is greater than the reference wave 34.

FIG. 3c is a timing diagram showing an output waveform 38 of power converter circuit 24b as a function of the first carrier wave 30 and the reference wave 34. Again, the PWM signal is positive when the first carrier wave 30 is less than the reference wave 34 and negative when the first carrier wave 30 is greater than the reference wave 34. This result is achieved by appropriate switching signals from the slave controller 23.

The waveforms 36, 38 described above assume analog carrier waves 30, 32 and an analog reference wave 34. Due to bandwidth limitations, however, it may be desirable instead to digitally sample the reference wave 34. A waveform 35 is a digital sample of the analog reference wave 34, with the sampling typically occurring on a first edge, such as a falling edge of the carrier wave 30. The sampling could also be performed at other times, such as on a rising edge, or on both rising and falling edges.

Sampling introduces deviations from the analog system. For example, using the digital sample 35 and the first carrier wave 30, the PWM signal 38 would be negative at point A, while the analog reference wave 34 does not become negative until point B. Thus, digital sampling causes the PWM signals 36, 38 to vary slightly from the waveforms 36, 38 as shown.

Using a higher frequency carrier wave may reduce the variations that occur as a result of the digital sampling. Although approximately 10 carrier wave cycles occur per reference wave cycle in FIG. 3a, in one embodiment the carrier wave is a 4 KHz signal and the reference wave is a 60 Hz signal, thereby having more carrier wave cycles per reference wave cycle than shown in FIG. 3a. Using a higher frequency carrier wave effectively reduces the distance between points A and B, thus creating a PWM signal using digital sampling that more closely approximates the waveform 38.

Digital sampling may also cause problems with the power conversion system 10 because of the second carrier wave 32. The digital waveform 35 will be equal to the analog waveform 34 on the falling edge (the sampling point) of the first carrier wave 30. Therefore, a PWM signal created with a digital waveform 35 (for power converter 24a, for example) will match the PWM signal 36 created with the analog signal 34.

The falling edge of the second carrier wave 32 occurs approximately halfway between the sampling points used to create the digital waveform 35. Thus, on average, a deviation in the PWM signal created from the digital waveform 35 at this point, when multiplied by the duration of the deviation (until the next sampling point occurs) will cause the most significant change in the PWM signal, as will be obvious from the below discussion.

To counteract this, in one embodiment, an approximation or offset value $\Delta_{sin}$ of the difference between the digital waveform 35 and the analog reference wave 34 is determined. $\Delta_{sin}$ may be determined by any of a variety of mathematical techniques known to those skilled in the art. $\Delta_{sin}$ is then added to the digital waveform 35 on the falling edge of the second carrier wave 32 when the slope of the digital waveform 35 is increasing (i.e., the sine wave is increasing in value), and is subtracted from the digital waveform 35 on the falling edge of the second carrier wave 32 when the slope is decreasing.

The adjustment by $\Delta_{sin}$ may be similarly applied to power converter system 20 having more than two power converter circuits 24. Where n power converter circuits are used, the $n^{th}$ unit would add/subtract (as described above) $(n-1)*\Delta_{sin}$ to the value of the digital waveform 35 to determine the reference waveform value for the $n^{th}$ power converter circuit. This determined reference waveform value is then compared with the value of the carrier wave for the $n^{th}$ power converter circuit as described above.

Referring back to the two power converter circuit embodiment shown in FIG. 2, failure to adjust by $\Delta_{sin}$ when using the digital waveform 35 would shift the PWM signal 36 to the left by half of the sampling period of the digital waveform 35. This in effect generates an undesired phase offset (with respect to FIG. 3). This could cause current flow between the outputs of the power converters 24a, 24b, which is undesirable. This problem also exists with power converter systems 20 using additional power converter circuits 24.

Thus, in one embodiment of the invention using the $\Delta_{sin}$ offset value, the master controller 22 transmits the digital reference wave value and the $\Delta_{sin}$ offset value to the n slave controllers 23. The n slave controllers then determine their reference wave form value as described above.

A similar technique can be used to update the reference wave value for the subsequent rising edge of the first carrier wave 30. The error corrected is often minimal, however, and in many instances, not worth the efforts used to correct it.

In another embodiment, a second digital reference waveform (not shown) may be generated for determining the PWM signal 36. By determining an appropriate second reference waveform, the $\Delta_{sin}$ compensation described above need not be used. This technique, however, may require the use of additional bandwidth.

In another embodiment, the digital waveform 35 may be sampled more frequently, such as on the falling edge of the second carrier wave 32 in addition to the falling edge of the first carrier wave 30.

Referring back to FIG. 2 and assuming ideal conditions as described above, the n power converter circuits 24 respectively transmit n PWM signals, such as waveforms 36, 38 to n conversion circuits, such as output inductors 40, 42. The output inductors 40, 42 transmit a current signal that is a function of the integral of the received PWM signals 36, 38. Typically n output inductors respectively receive the n PWM signals. Thus in the embodiment shown, two output inductors 40, 42 are shown.

FIG. 4a is a waveform diagram according to one embodiment of the invention showing waveforms 44, 46 respectively transmitted by the output inductors 40, 42. The output waveforms 36, 38 from FIGS. 3b and 3c have been reproduced in FIG. 4a for ease of reference. As can be seen from FIG. 4a, the waveform 44 from the output inductor 40 is the integral of the waveform 36, while the waveform 46 from the output inductor 42 is the integral of the waveform 38.

A summer, such as a node 44, receives the n current signals from the n output inductors and transmits an AC signal, such as a sine wave, as a function of the sum of the n current signals. Typically the AC signal is equal to the sum of the n current signals. Although a node 44 is shown, other summing circuits known to those skilled in the art may also be used.

Figure 1:
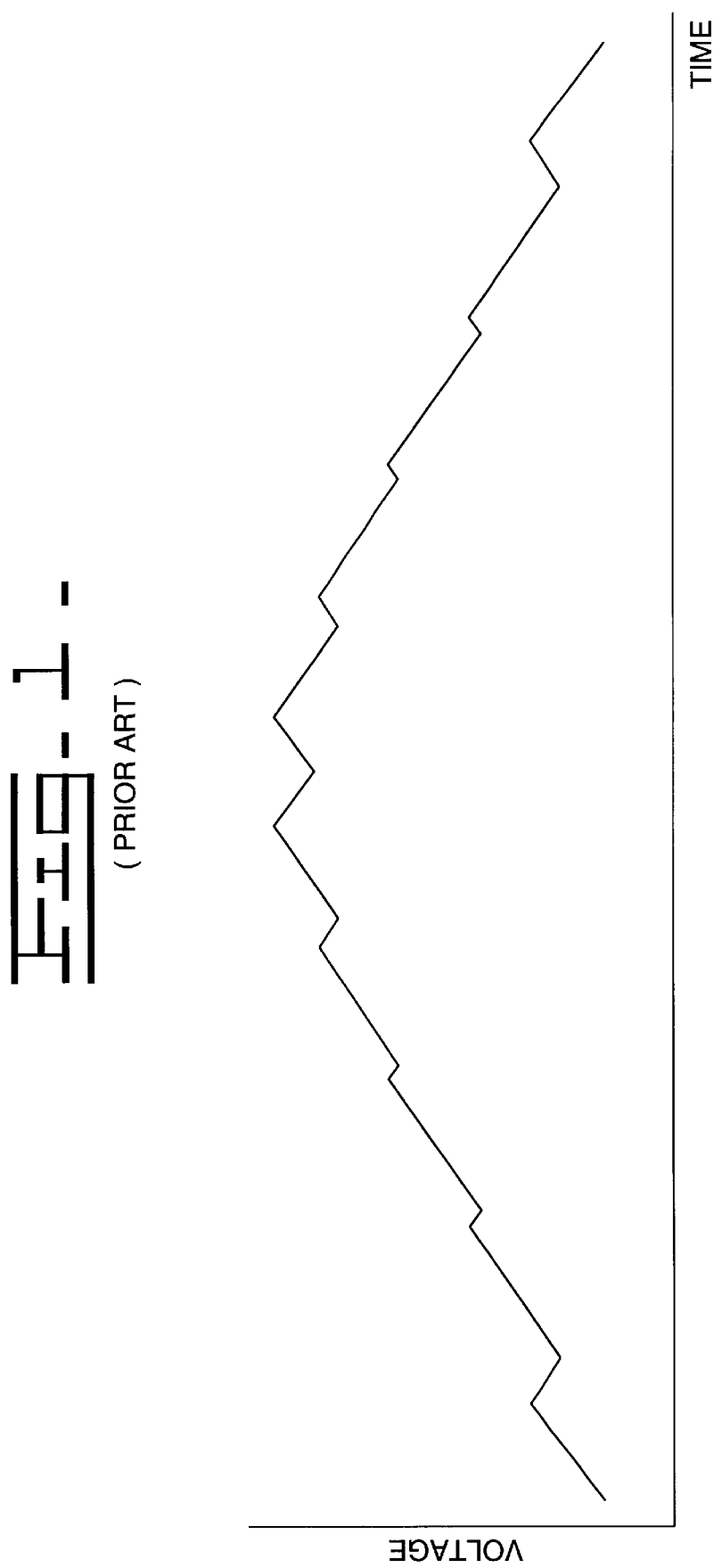
FIG. 1 is an example of a sine wave containing a ripple current having a low frequency and a high amplitude.

FIG. 4b is a waveform diagram according to one embodiment of the invention showing a sine wave 48 that is output from the node 44. As can be seen by comparing FIG. 4b with FIG. 1, the sine wave 48 has a ripple current having a reduced amplitude and an increased frequency as compared to the output of many conventional power converter systems 20.

In one embodiment, an output filter 50 is coupled with the node 44 to receive the sine wave 48. The output filter 50 smoothes the sine wave 48, more closely approximating an ideal sine wave. Because the ripple current is reduced, the output filter 50 may contain smaller components, or alternately, emit less heat, than if the output filter 50 were coupled with a power conversion system 10 using a conventional power converter system 20.

Although the above discussion has focussed primarily on single-phase power, the invention as disclosed herein can also be practiced in multi-phased applications. Each phase would typically use carrier waves that are out of phase by 360/n from the other carrier waves used to generate the power for that phase. Each PWM signal output by the power converter circuits 24 would have a separate output inductor. Thus, in an embodiment using two three-phase power converter circuits 24, six output inductors would be used. Similarly, a summer and output filter for each phase of power is used. Thus, three summers and three output filters would be used.

Embodiments of the invention may be used in various applications known to those skilled in the art requiring an A.C. power supply, in both load and no-load conditions.

In addition, the above discussion is not intended to imply that embodiments of the invention must be implemented exclusively with hardware. In appropriate situations, software may be used. The word "circuit" is intended to describe both software and hardware, with software being, in effect, a temporary circuit.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An apparatus for transmitting power, comprising:
    a controller circuit operable to transmit n command signals;
    n power converter circuits coupled with the controller circuit to respectively receive the n command signals, the n power converter circuits operable to respectively transmit n pulse width modulated signals as a function of the n command signals, the n pulse width modulated signals being out of phase by approximately 360/n degrees;
    wherein the controller circuit is further operable to determine n carrier waves, the n carrier waves being out of phase by approximately 360/n degrees, and to determine n reference wave values on respective first edges of the n carrier waves, the n command signals being a function of the respective carrier waves and the respective reference wave values; and
    wherein the controller is operable to determine an initial reference wave value, to determine an offset value as a function of a frequency of the first and second carrier waves, the first reference wave value, and the phase offset of the first and second carrier waves, to determine a second reference wave value as a function of the first reference wave value and the offset value.

2. The apparatus of claim 1 wherein n is equal to four, and each of the n power converter circuits is operable to transmit 250 KW of power.

3. The apparatus of claim 1 wherein the n command signals are operable to cause the n power converter circuits to respectively transmit a pulse width modulated signal having a relatively high value when the respective carrier wave is less than the respective reference wave value and having a relatively low value when the respective carrier wave is greater than the respective reference wave value.

4. The apparatus of claim 1 wherein the n command signals comprise switching signals.

5. The apparatus of claim 1 wherein the controller circuit comprises:
    a master controller circuit; and
    n slave controller circuits coupled with the master controller circuit and the n power converter circuits, the n slave controller circuits operable to respectively transmit the n command signals.

6. The apparatus of claim 5 wherein the master controller circuit is operable to transmit a reference wave value and the n slave controller circuits are coupled with the master controller circuit to receive the reference wave value, the n slave controller circuits operable to transmit the n command signals as a function of the reference wave value.

7. The apparatus of claim 6 wherein the master controller is further operable to transmit an offset value to the n slave controllers, and the n slave controllers are operable to transmit the n command signals as a function of the offset value.

8. The apparatus of claim 1 wherein the n carrier waves comprise AC waves.

9. The apparatus of claim 1 wherein the n carrier waves comprise triangle waves.

10. The apparatus of claim 1 wherein the reference wave comprises an AC wave.

11. The apparatus of claim 1 wherein the reference wave comprises a sine wave.

12. The apparatus of claim 1, further comprising
n conversion circuits respectively coupled with the n power converter circuits to respectively receive the n pulse width modulated signals and to produce n current signals as a function of the respective n pulse width modulated signal.

13. The apparatus of claim 12 wherein each of the conversion circuits comprises an inductor.

14. The apparatus of claim 12 wherein each of the n current signals approximately comprises the integral of the respective n pulse width modulated signals.

15. The apparatus of claim 12 further comprising:
a summer coupled with the n conversion circuits to receive the n current signals, the summer operable to transmit an AC signal as a function of the sum of the n current signals.

16. The apparatus of claim 15 wherein the AC signal comprises a sine wave.

17. The apparatus of claim 15 wherein the summer comprises a node.

18. An apparatus for transmitting power, comprising:
a first means for transmitting a first command signal and a second command signal;
a second means for transmitting a first pulse width modulation signal, the second means being coupled with the first means to receive the first command signal and transmitting the first pulse width modulation signal as a function of the first command signal; and
a third means for transmitting a second pulse width modulation signal, the third means being coupled with the first means to receive the second command signal and transmitting the second pulse width modulation signal as a function of the second command signal, the second pulse width modulation signal being out of phase with the first pulse width modulation signal by approximately 360/n, n being the number of means being used to transmit pulse width modulation signals.

19. An apparatus for transmitting power using n power converter circuits, comprising:
a master controller circuit operable to transmit a reference wave value signal and an offset value signal;
n slave controller circuits coupled with the master controller circuit to receive the reference wave value signal and the offset value signal, the n slave controller circuits operable to respectively transmit n switching signals as a function of the reference wave value signal and the offset value signal;
a first power converter circuit coupled with one of the slave controller circuits to receive one of the switching signals, the first power converter circuit operable to transmit a first pulse width modulation signal as a function of the one of the switching signals;
a second power converter circuit coupled with another one of the slave controller circuits to receive another one of the switching signals, the second power converter circuit operable to transmit a second pulse width modulation signal as a function of the another one of the switching signals, the second pulse width modulation signal being out of phase with the first pulse width modulation signal by approximately 360/n degrees;

a first output inductor circuit coupled with the first power converter circuit to receive the first pulse width modulation signal, the first output inductor circuit operable to transmit a first sine wave signal as a function of the integral of the first pulse width modulation signal;
a second output inductor circuit coupled with the second power converter circuit to receive the second pulse width modulation signal, the second output inductor circuit operable to transmit a second sine wave signal as a function of the integral of the second pulse width modulation signal; and
an output node coupled with the first and second output inductor circuits to receive the first and second sine wave signals, the output node operable to sum the first and second sine wave signals.

20. A method for transmitting power using n power converter modules, comprising:
transmitting a first pulse width modulated signal as a function of a first carrier wave signal and a reference wave signal;
transmitting a second pulse width modulated signal as a function of a second carrier wave signal, an offset signal, and the reference signal, the second pulse width modulated signal being out of phase with the first pulse width modulated signal by approximately 360/n degrees;
transmitting a first current signal approximately equal to the integral of the first pulse width modulated signal;
transmitting a second current signal approximately equal to the integral of the second pulse width modulated signal; and
summing the first and second current signals.

21. The method of claim 20 wherein the third current signal comprises an AC signal.

22. The method of claim 20 wherein the third current signal approximately comprises a sine wave.

23. A method for transmitting power using n power converter module circuits, comprising:
determining a first carrier wave;
determining a second carrier wave, the second carrier wave being out of phase with the first carrier wave by approximately 360/n degrees;
determining a first reference wave value on a first edge of the first carrier wave;
determining a second reference wave value on a first edge of the second carrier wave;
transmitting a first pulse width modulated signal as a function of the first reference wave value and the first carrier wave, the first pulse width modulated signal being positive when the first carrier wave value is less than the first reference wave and being negative when the first carrier wave value is greater than the first reference wave; and
transmitting a second pulse width modulated signal as a function of the second reference wave value and the second carrier wave, the second pulse width modulated signal being positive when the second carrier wave is less than the second reference wave value and being negative when the second carrier wave is greater than the second reference wave value;
wherein determining the second reference wave value comprises:
determining an offset value as a function of a frequency of the first and second carrier waves, the first refer ence wave value, and the phase offset of the first and second carrier waves, the second reference wave value being a function of the first reference wave value and the offset value.

24. The method of claim 23 wherein the first and second carrier waves comprise triangle waves.

25. The method of claim 23 wherein the reference wave comprises a sine wave.

26. The method of claim 23 wherein the first edge of the first carrier wave comprises a falling edge and the first edge of the second carrier wave comprises a falling edge.

27. The method of claim 23, further comprising:

transmitting a first current signal approximately equal to the integral of the first pulse width modulated signal; and transmitting a second current signal approximately equal to the integral of the second pulse width modulated signal.

28. The method of claim 27, further comprising:

transmitting a third current signal approximately equal to the sum of the first and second current signals.

29. The method of claim 28 wherein the third current signal comprises AC signal.

30. The method of claim 28 wherein the third current signal comprises a sine wave.

31. The apparatus of claim 19 wherein the n slave controller circuits are operable to respectively determine n carrier wave signals, and wherein the n switching signals are a function of the respective n carrier wave signals.

32. The apparatus of claim 18 wherein the first means comprises a controller circuit including a master controller and a slave controller; and the first and second command signals comprise switching signals.

\* \* \* \* \*

UNITED STATES PATENT AND TRADEMARK OFFICE
CERTIFICATE OF CORRECTION

PATENT NO. : 6,466,469 B2
DATED : October 15, 2002
INVENTOR(S) : Michael A. Caruthers et al.

It is certified that error appears in the above-identified patent and that said Letters Patent is hereby corrected as shown below:

Column 7,
Line 7, insert a colon -- : -- after the word "comprising".

Column 8,
Line 67, insert a hyphen -- - -- after the word "refer".

Column 10,
Line 5, insert the word -- an -- between "comprises" and "AC".

Signed and Sealed this

Fourth Day of February, 2003

JAMES E. ROGAN
*Director of the United States Patent and Trademark Office*